US012753337B2

(12) United States Patent
Huval et al.

(10) Patent No.: US 12,753,337 B2
(45) Date of Patent: Oct. 6, 2026

(54) METHOD OF IMPROVING INJECTION PRESSURE AND ASPHALTENE REMEDIATION

(71) Applicant: Baker Hughes Oilfield Operations LLC, Houston, TX (US)

(72) Inventors: Wendy Huval, St. Martinville, LA (US); Marty Usie, Youngsvile, LA (US); Kelly Berard, Breaux Bridge, LA (US); Naima Bestaoui-Spurr, The Woodlands, TX (US)

( * ) Notice: Subject to any disclaimer, the term of this patent is extended or adjusted under 35 U.S.C. 154(b) by 0 days.

(21) Appl. No.: 19/197,054

(22) Filed: May 2, 2025

(65) Prior Publication Data

US 2025/0257257 A1 Aug. 14, 2025

Related U.S. Application Data

(63) Continuation-in-part of application No. 18/513,151, filed on Nov. 17, 2023, now abandoned.

(51) Int. Cl.
*E21B 37/06* (2006.01)
*C09K 8/524* (2006.01)
*E21B 43/16* (2006.01)

(52) U.S. Cl.
CPC .............. *C09K 8/524* (2013.01); *E21B 37/06* (2013.01); *E21B 43/16* (2013.01)

(58) Field of Classification Search
None
See application file for complete search history.

(56) References Cited

U.S. PATENT DOCUMENTS

| | | | | |
|---|---|---|---|---|
| 5,354,505 | A | 10/1994 | Mendoza | |
| 6,048,904 | A | 4/2000 | Wiehe et al. | |
| 2007/0295640 | A1 | 12/2007 | Tan et al. | |
| 2012/0190592 | A1 | 7/2012 | Halim et al. | |
| 2013/0186629 | A1 | 7/2013 | Leonard et al. | |
| 2013/0196885 | A1 | 8/2013 | Pabalan et al. | |
| 2016/0145487 | A1 * | 5/2016 | Alam | E21B 43/16 507/252 |
| 2017/0240804 | A1 * | 8/2017 | Tellez | C09K 8/38 |

(Continued)

FOREIGN PATENT DOCUMENTS

CN 101712787 A 5/2010

OTHER PUBLICATIONS

International Search Report and Written Opinion for International Application No. PCT/US2024/056155, International Filing Date Nov. 15, 2024, Date of Mailing Feb. 26, 2025, 10 pages.

*Primary Examiner* — Andrew Sue-Ako
(74) *Attorney, Agent, or Firm* — Baker Hughes Company

(57) ABSTRACT

A method of removing deposits from a substrate includes contacting the deposits with a treatment fluid containing a solvent and an additive composition including at least one of an alkylbenzene sulfonic acid or an alkylbenzene sulfonate wherein the treatment fluid is substantially free of water; and separating the deposits from the substrate with the treatment fluid to remove the deposits from the substrate, wherein the deposits includes asphaltenes. The deposits can be removed during a fracturing, acidizing, sand control, remedial, completion, or refracturing operation. The treatment fluid can also reduce the viscosity of crude oil and enhance oil recovery.

19 Claims, 6 Drawing Sheets

(56) References Cited

U.S. PATENT DOCUMENTS

| | | | | |
|---|---|---|---|---|
| 2018/0037792 | A1 | 2/2018 | Champagne et al. | |
| 2018/0079951 | A1 | 3/2018 | Quintero et al. | |
| 2023/0183549 | A1 | 6/2023 | Swanson et al. | |
| 2023/0272263 | A1* | 8/2023 | Farmer .................... | C09K 8/74<br>507/90 |

* cited by examiner

A B

METHOD OF IMPROVING INJECTION PRESSURE AND ASPHALTENE REMEDIATION

CROSS REFERENCE TO RELATED APPLICATIONS

This application is a continuation-in-part of U.S. application Ser. No. 18/513,151 filed Nov. 17, 2023, the disclosure of which is incorporated by reference herein in its entirety.

BACKGROUND

Asphaltenes are a major component in crude oil, and there is general agreement as to the deleterious effects of asphaltenes in the reduction of oil extraction and processing in the petrochemical industry. Asphaltenes can deposit in the pores of formations, blocking the flow of fluids. Additionally, asphaltenes can precipitate from a stream of oil and coat boreholes, production tubing, sand screens, and transport lines. Moreover, in a processing facility, asphaltenes can foul processing equipment and poison catalysts. Accordingly, methods for removing asphaltene deposits from oil environments such as a reservoir would be well received in the art.

SUMMARY

A method of removing deposits from a substrate includes contacting the deposits with a treatment fluid comprising a solvent and an additive composition comprising at least one of an alkylbenzene sulfonic acid or an alkylbenzene sulfonate; and separating the deposits from the substrate with the treatment fluid to remove the deposits from the substrate, wherein the deposits comprise asphaltenes.

BRIEF DESCRIPTION OF THE DRAWINGS

The following descriptions should not be considered limiting in any way. With reference to the accompanying drawings, like elements are numbered alike.

DETAILED DESCRIPTION

Figure 5:
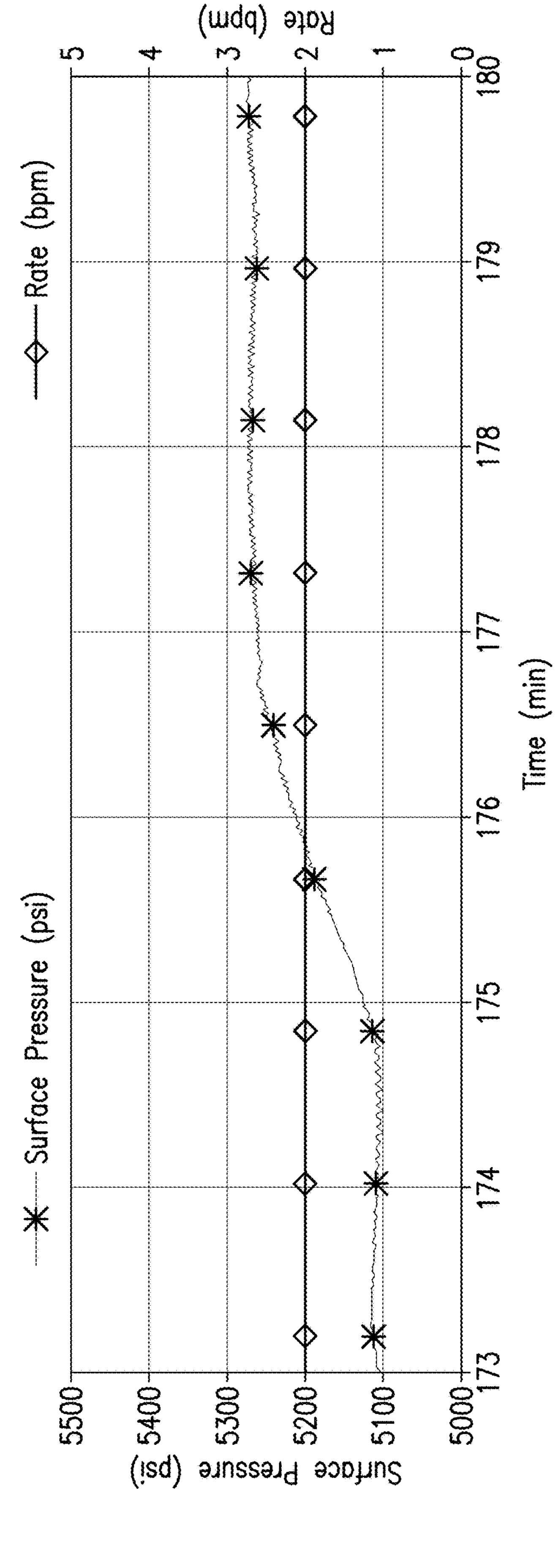
FIG. 5 is a graph of injection pressure (also referred to as surface pressure) and pumping rate as a function of time after a prior treatment fluid is pumped into a wellbore.

Asphaltenes are components of crude oils and can contain numerous individual compounds, particularly high molecular weight condensed aromatic compounds including heteroatoms such as sulfur, oxygen, nitrogen, and the like. The heteroatoms may be part of the aromatic ring system or part of other carbocyclic rings, linking groups, substituents, or functional groups. Aromatic solvents can be used to remove asphaltene deposits. However, due to the complexity of the asphaltene chemistry, a solvent which is effective to remove certain asphaltene molecules may not be effective to remove asphaltenes having more complex structures. In such circumstances, when applying solvents to remove asphaltene deposition in a formation, a pressure increase in regard to surface treating pressure may be observed. See, e.g., FIG. 5. This can be considered an unfavorable response by operators who would prefer to see a pressure decline.

The inventors have discovered a treatment fluid that can effectively remove asphaltene deposits with improved injection pressure during pumping treatments. In addition to improved performance over an asphaltene solvent, another advantage is the time that is saved when applying the treatment fluid. Often when injection pressure increases are encountered, solvents are pumped at lower rates which can result in extra time to complete a treatment. The treatment fluid as described removes asphaltenes without pressure increase, thus providing a fast and efficient asphaltene removal method. The method can also improve injectivity and wetting characteristics and stimulate production in wells damaged or impaired by asphaltene deposition.

The treatment fluid comprises a solvent and an additive composition. The treatment fluid can be free of water, or substantially free of water. By substantially free of water is meant the treatment fluid contains less than 1%, less than 0.05%, less than 0.1%, less than 0.05%, less than 0.01%, less than 0.005%, less than 10 ppm, less than 5 ppm, or less than 1 ppm based on total weight of the treatment fluid. The treatment fluid being free of or substantially free of water generally would not be or not be considered an emulsion.

Without wishing to be bound by theory, it is believed the treatment fluid as disclosed herein increases intermolecular interactions between the organic deposits and the treatment fluid. This can then lead to better solubility of the deposit and decreasing the injection treatment pressure.

The solvent can comprise an aromatic solvent, optionally in combination with a co-solvent. The aromatic solvent can be, for example, toluene, xylenes, or light aromatic naphtha, alkyl substituted benzenes or a mixture comprising at least two of the foregoing aromatic solvent. As used herein, a light aromatic naphtha refers to a combination of hydrocarbons obtained from distillation of aromatic streams. For example, the treatment fluid can comprise a mixture of mono, di, or tri alkyl substituted benzenes and a light aromatic naphtha. The light aromatic naphtha can consist predominantly of aromatic hydrocarbons having carbon numbers predominantly in the range of C8 through C10 and boiling in the range of approximately 135° C. to 210° C. (275° F. to 410° F.). The light aromatic naphtha can have a CAS #64742-95-6. A content of the aromatic solvent can be about 10 to about 99 or about 90 volume percent, preferably about 15 to about 75 volume percent, more preferably about 30 to about 60 volume percent, based on a total volume of the treatment fluid.

The co-solvent can include at least one of an alcohol, an amine, an amide, an ether, an ester, a ketone, acetonitrile, dimethylsulfoxide, or a carbonate such as propylene carbonate.

The alcohol can be a mono or polyhydric alcohol having 1 to 8 carbon atoms. The alcohol can also include one or more ether moiety. Examples of the alcohol include methanol, ethanol, n-propanol, iso-propanol, butanol, glycerol, a glycol such as ethylene glycol; propylene glycol; and diethylene glycol, 2-methyl-hexanol, 1-methoxy-2-propanol, and 2-butoxyethanol.

Examples of the amine include methylamine, diethyl amine, and tributyl amine. Examples of the amide include dimethylformamide. The ether can include diethyl ether, polyether, and tetrahydrofuran. The ester can include ethyl acetate, methyl butyrate, and the like. An example of the ketone is acetone.

If present, a content of the co-solvent can be about 0 or greater than 0 to about 90 volume percent, preferably about 0.1 to about 40 volume percent, about 0.1 volume percent to about 30 volume percent, more preferably about 0.5 volume percent to about 15 volume percent, based on a total volume of the treatment fluid. In an aspect, the solvent comprises both the aromatic solvent and the co-solvent, and a volume ratio of the aromatic solvent relative to the co-solvent is about 100:0 to about 10:90, preferably about 99.9:0.1 to about 85:15.

The additive composition comprises an alkylbenzene sulfonic acid or an alkylbenzene sulfonate. Without wishing to be bound by theory, it is believed that the solvent can react with the asphaltene, facilitating the removal of asphaltene deposits from the substrate, and the additive composition, for example, the alkylbenzene sulfonate can keep the asphaltene small and dispersed, instead of precipitating. The alkylbenzene sulfonic acid can be a linear alkylbenzene sulfonic acid (LAS) or a branched alkylbenzene sulfonic acid (BAS). Preferably, the alkylbenzene sulfonic acid is a $C_{5-25}$, $C_{8-20}$, $C_{10-20}$, or $C_{10-18}$ alkyl benzene sulfonic acid such as dodecylbenzenesulfonic acid and 2-hexadecylbenzene sulfonic acid. An alkylbenzene sulfonate can include a salt of an alkylbenzene sulfonic acid. Suitable salts can be a sodium salt, a magnesium salt, an ammonium salt, or an amine salt. A content of the alkylbenzene sulfonic acid, the alkylbenzene sulfonate, or a combination thereof can be about 0.1 to about 99 volume percent, preferably about 0.5 to about 90 volume percent, more preferably about 1 to about 75 volume percent, based on a total volume of the additive composition. The amount of the alky benzene sulfonic acid or alkylbenzene sulfonate can be, for example, from about 1, from about 3, from about 4, or from about 5 up to about 25, up to about 20, up to about 15, or up to about 10 volume % based on total volume of the treatment fluid.

The additive composition can also comprise an additional surfactant (such as, for example a nanosurfactant) other than an alkylbenzene sulfonic acid or an alkylbenzene sulfonate. In an aspect, the additional surfactant comprises sodium trideceth sulfate. The additional surfactant can be present in an amount of about 0 or about 0.1 to about 20 volume percent, preferably about 0 or about 0.1 to about 15 volume percent, and more preferably about 0 or about 0.5 to about 12 volume percent, based on the total volume of the additive composition. The nanosurfactant can be from about 0.1 or about 0.15 to about 10 or about 5 volume % of the total volume of the treatment fluid. For example, use of a nanosurfactant can improves wettability and interactions between the solvent and the build-up organic deposits. This enables the treatment to be highly effective in penetrating the organic deposition, effectively dispersing and dissolving the deposition thus removing the damage. The nanosurfactant is small having a size in the nanometer range, e.g., 1 to 100 nm. Examples of nanosurfactants include sodium lauryl sulfate, sodium laureth sulfate, benzalkonium chloride, cetyltrimethylammonium bromide, ethoxylated aliphatic alcohol, polyoxyethylene surfactants, betaines, and sodium trideceth sulfate. Adding a nanosurfactant can decrease the total amount of surfactant needed for effective removal of the asphaltenes.

The additive composition can further include an acid component. Using an acid component can be particularly beneficial when the deposits also include inorganic scales mixed with asphaltenes. The acid component can include an acid, an acid precursor, or a combination thereof. The acid can be an inorganic acid such as HCl; $H_2SO_4$; HF; and $HNO_3$, an organic acid such as acetic acid; glacial acetic acid; formic acid; lactic acid; citric acid; phthalic acid; or an amino acid such as glutamic acid. Acid precursors can include esters or anhydrides such as acetic anhydride. Combinations of the acids and/or acid precursors can be used.

The acid component can be present in an amount of about 0 or about 0.1 to about 80 volume percent, about 0 or about 0.1 to about 50 volume percent, preferably about 0 or about 0.5 to about 30 volume percent, based on a total volume of the additive composition.

The treatment fluid can be prepared by combing the solvent and the additive composition. A content of the additive composition can be about 0.1 to about 99 volume percent, preferably about 0.5 to about 70 volume percent, more preferably, about 1 to about 50 volume percent, based on a total volume of the treatment fluid. Preferably, the treatment fluid is a homogeneous single-phase fluid.

As a specific example, the treatment fluid can comprise or consist of about 10 to about 99 volume percent, preferably about 15 to about 75 volume percent, more preferably about 30 to about 60 volume percent of an aromatic solvent comprising at least one of toluene, xylenes, or a low aromatic naphtha, and about 0 to about 50 volume percent, about 0.1 to about 40 volume percent, or about 0.5 to about 15 volume percent of a co-solvent comprising at least one of an alcohol, an amine, an amide, an ether, an ester, a ketone, acetonitrile, dimethylsulfoxide, or a carbonate, each based on a total volume of the treatment fluid; and about 0.5 to about 70 volume percent, preferably about 1 to about 40 volume percent of the additive composition, wherein the additive composition comprises about 0.5 to about 99 or about 70 volume percent, preferably about 1 to about 50 volume percent of a $C_{5-25}$ alkylbenzene sulfonic acid or a salt thereof, and about 0 or about 0.1 to about 12 or about 10 volume percent, preferable about 0 or about 0.5 to about 5 volume percent of an additional surfactant comprising sodium trideceth sulfate, and about 0 or about 0.1 to about 50 volume percent, preferably about 0 or about 0.5 to about 30 volume percent, or about 0.5 to about 8 volume percent of an acid component, each based on a total volume of the additive composition.

The treatment fluid is effective to remove deposits from a substrate. The deposits can include organic deposits and optionally inorganic scales. The organic deposits include asphaltenes, and optionally resins and/or paraffin wax, and the like. The substrate can be formation, downhole element such as tubular; proppants; production tubing; sand screens; transport lines; or other downhole equipment including the surfaces thereof, a metal, composite, sand, rock, mineral, glass, or a combination comprising at least one of the foregoing.

The deposits, which are disposed on the substrate, can be removed from the substrate by contacting the deposits with the treatment fluid. Beneficially, the methods described herein, e.g., contacting the deposits with the treatment fluid, can be performed in an environment such as a pipeline, downhole, formation, tubular, frac feature (e.g., a vein or pore), production zone, reservoir, refinery, transport tube, production tube, or a combination thereof.

In an aspect, contacting the deposits with the treatment fluid is performed in a subsurface environment including but is not limited to a near-wellbore region. In such an instance, the method can include introducing the treatment fluid into the subsurface environment. Any known methods can be used. The treatment fluid can be introduced into a subsurface environment through an umbilical line, a coil tubing, or via a bullhead method through a flowline or a tubing. For example, a squeeze operation can be used to deliver the treatment fluid to a reservoir or a near-wellbore region. In another embodiment for the production of petroleum, the treatment fluid can be applied in a continuous or batch injection process through a capillary line, down the backside of well annuluses, through an umbilical line, or through an umbilical/capillary line combination.

Figure 1:
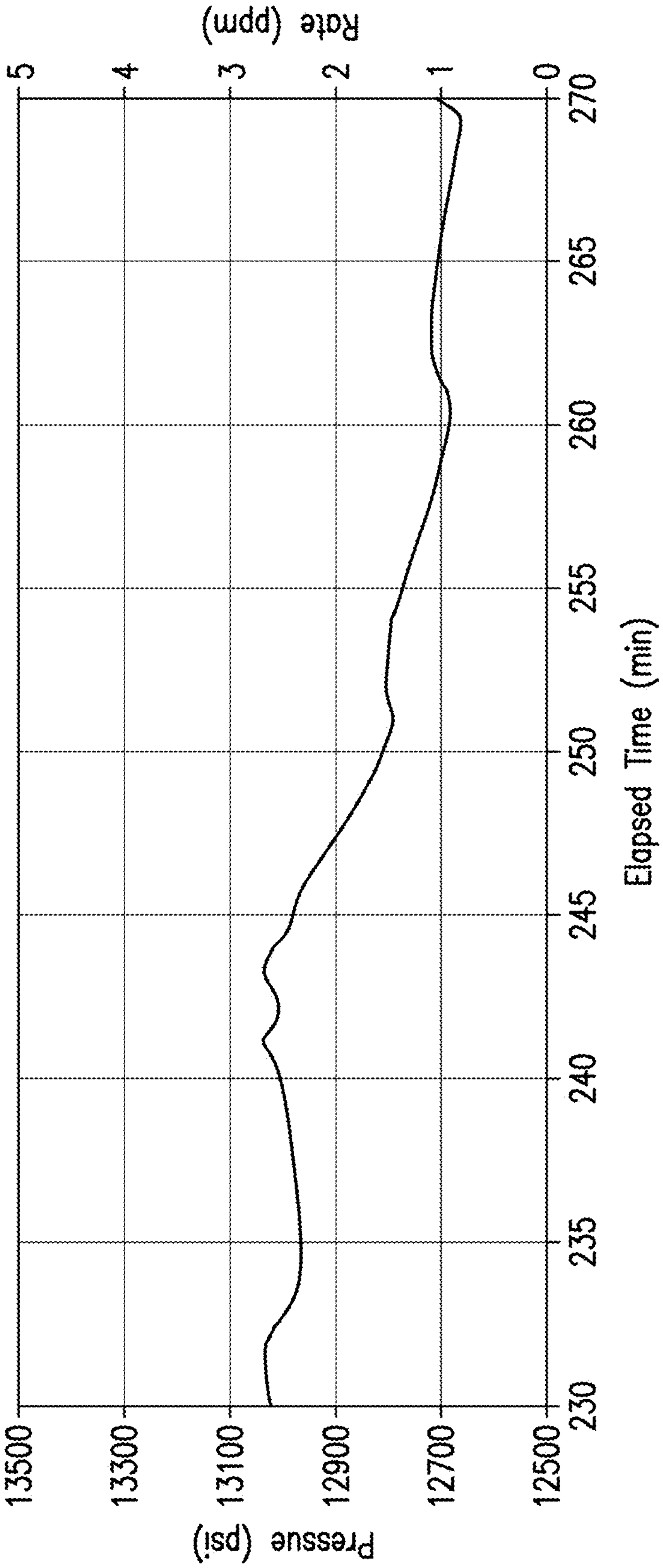
FIG. 1 is a graph of injection pressure and pumping rate as a function of time during a treatment fluid as described herein is pumped into a wellbore.
Figure 6:
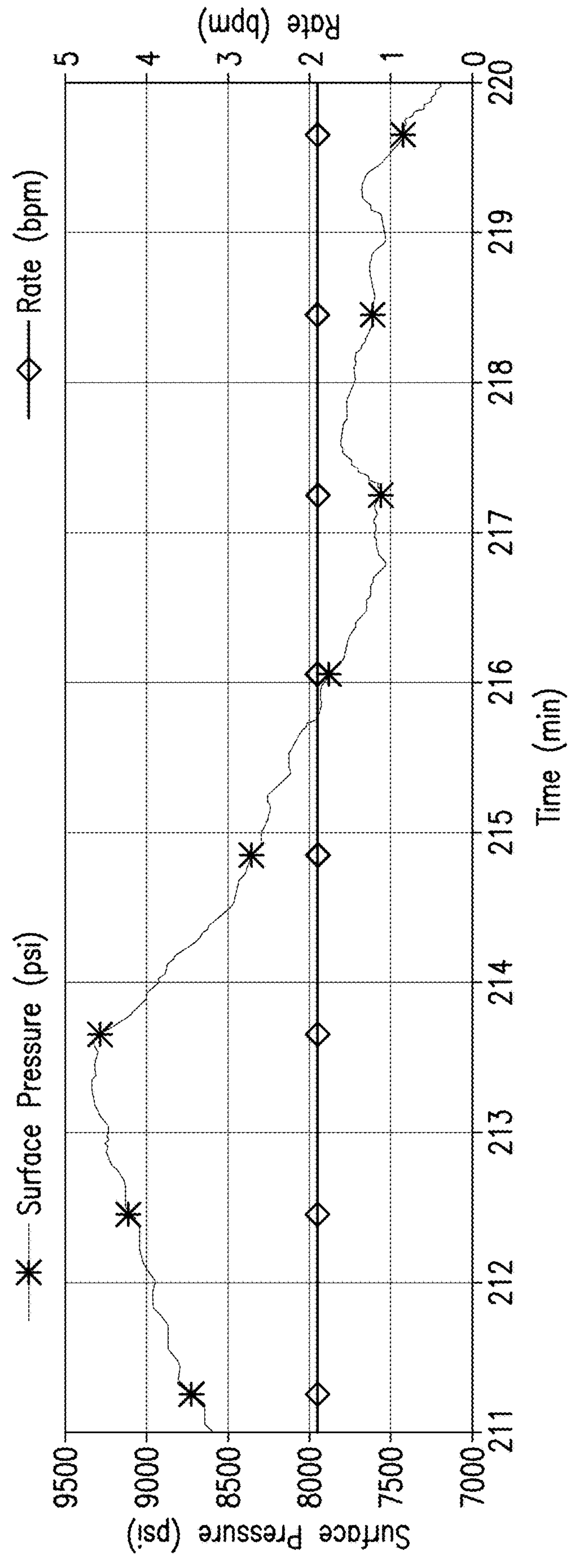
FIG. 6 is a graph of injection pressure and pumping rate as a function of time after a treatment fluid as described herein is pumped into a wellbore.

Advantageously, the process does not restrict injection pressure. As shown in in FIGS. 1 and 6, the injection pressure can decrease rather than increase when the treatment fluid is injected into a subsurface environment. Particularly, the pressure during injection can decrease from a time during injection, T1, to a later time during injection, T2, by 2% or more (as shown in FIG. 1), or by 5% or more, or even by 10% or more (as shown in FIG. 6). The decrease in pressure could be as much as 40% or 30%. The percentages are calculated as 100×(pressure at time T2−pressure at T1)/(pressure at T1).

Figure 2:
FIG. 2 compares the wetting characteristics of a control (aromatic solvent/co-solvent/surfactant blend without alkylbenzene sulfonic acid or alkylbenzene sulfonate) with that of a treatment fluid according to the disclosure.

The treatment fluid as disclosed herein can also improve the wettability of a surface as illustrated in FIG. 2, which compares the wetting characteristics of a control (A, aromatic solvent/co-solvent/surfactant blend without alkylbenzene sulfonic acid or alkylbenzene sulfonate) with that of a treatment fluid according to the disclosure (B).

The treatment fluid can contact the deposits at a temperature of about 30° F. to about 450° F., preferably about 100° F. to about 400° F. Moreover, the deposits can be removed from the environment after separating the deposits from the substrate.

The treatment fluid can be used to remove deposits during a fracturing, acidizing, sand control, remedial, completion, restimulation, or refracturing operation. In an embodiment, the deposits are removed during a pumping treatment placed in a completion or remedial operation. Such a treatment allows connectivity with establishing flow from reservoir to wellbore.

Surprisingly, it was found that injection with the treatment fluid as disclosed herein can effectively mitigate organic deposits using less volume and in a quicker time than conventional treatments with xylene. Specifically, the same or better mitigation dissolution of organic deposition could be achieved while having a percent decrease in volume (i.e., 100×[(volume of state of art xylene required)−(volume of treatment fluid as disclosed herein)]/(volume of state of art xylene required) of from 10, or from 20 up to 80 or up to 70%.

The treatment fluid can also be used as a pre flush. In other words, the treatment fluid can be injected into a subsurface environment to contact the deposits, then a solvent as described herein (without the additive composition) can be injected into the subsurface environment to remove the deposits from the substrate for enhanced contact during acid treatments or other operations. For example, when subsurface deposit is removed using the treatment fluid, the permeability of the subsurface environment (which can be porous media such as porous rock, gravel, sand screen) can increase and be restored to near the initial state, where the treatment has been applied. In such case if another remedial treatment such as an acid stimulation treatment is required, this second treatment will be more efficiently placed and will be more effective in stimulating the well The method as described herein can enhance oil recovery in a reservoir, borehole, downhole, production zone, formation, or a combination thereof. For example, removal of the deposits that constrict flow can restore flow in a plugged reservoir. Additionally, the method can increase permeability in porous media (e.g., a sand screen) and flow channels (e.g., a crack in a formation filled with proppant obtained in a fracking process). Removal of asphaltenes from pores of a rock formation, within a reservoir, or from a sidewall of a tubular, production tubing, borehole, or transportation tube can improve the permeability of such structures, leading to increased quality of oil as well as enhanced oil recovery.

Figure 3:
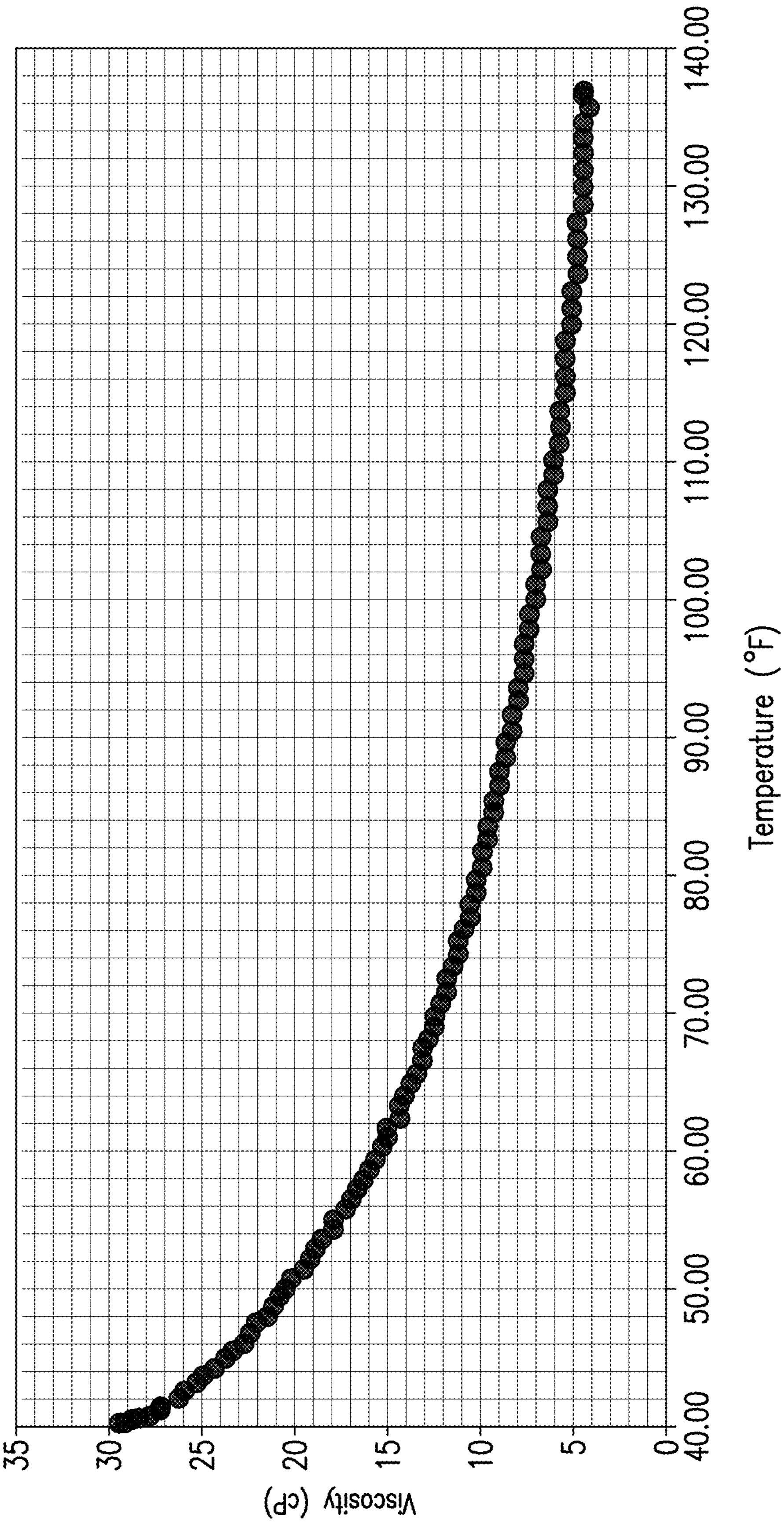
FIG. 3 is a graph of viscosity (centipoise, cP) of an untreated oil as a function of temperature (° F.)
Figure 4:
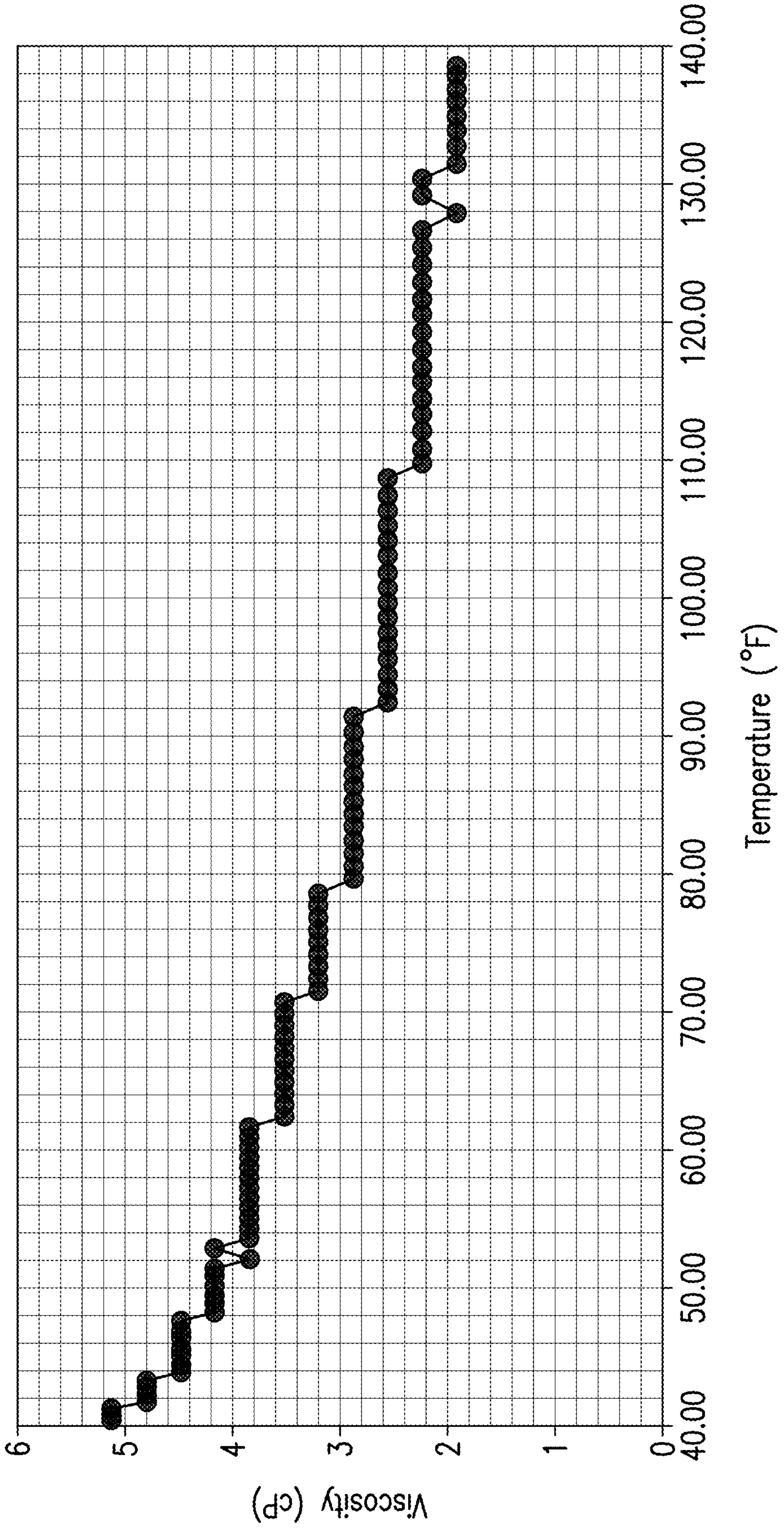
FIG. 4 is a graph of viscosity (centipoise, cP) as a function of temperature (° F.) after the oil of FIG. 3 is treated with a treatment fluid as described herein.

The treatment fluid can decrease the viscosity of crude oil making the oil more mobile for better recovery. This is especially important for heavy crude recovery. FIG. 3 a graph of viscosity (centipoise, cP) of an untreated oil as a function of temperature (° F.). FIG. 4 is a graph of viscosity (centipoise, cP) as a function of temperature (° F.) after a treatment fluid as described herein is contacted with a crude oil of FIG. 3. By comparing FIG. 3 with FIG. 4, it is clear that with the treatment fluid, the viscosity of the oil can be significantly reduced.

The treatment fluid requires less volume than a xylene treatment. For example, 1 g of asphaltenes was put in the presence of 100 mL of xylene at room temperature for 1 hr. The resulting solution was then collected and the asphaltenes were force precipitated using pentane. The amount of asphaltene collected was 1.43% showing the amount of Asphaltene dissolved in the xylene. The same experiment was repeated and this time using a treatment fluid as described herein and the amount of dissolved asphaltenes was 3.16%, over twice the amount for xylene.

Set forth below are various aspects of the disclosure.

Aspect 1. A method of removing deposits from a substrate, the method comprising: contacting the deposits with a treatment fluid comprising a solvent and an additive composition comprising at least one of an alkylbenzene sulfonic acid or an alkylbenzene sulfonate wherein the treatment fluid is substantially free of water; and separating the deposits from the substrate with the treatment fluid to remove the deposits from the substrate, wherein the deposits comprise asphaltenes.

Aspect 2. The method as in any prior aspect, wherein the solvent comprises an aromatic solvent; and the aromatic solvent comprises at least one of toluene, xylenes, or a light aromatic naphtha; and a content of the aromatic solvent is about 10 volume percent to about 99 volume percent, based on a total volume of the treatment fluid.

Aspect 3. The method as in any prior aspect, wherein the solvent further comprises a co-solvent comprising at least one of an alcohol, an amine, an amide, an ether, an ester, a ketone, acetonitrile, dimethylsulfoxide, or a carbonate, and a content of the co-solvent is about 0.1 to about 50 volume percent, based on a total volume of the treatment fluid.

Aspect 4. The method as in any prior aspect, wherein a content of the additive composition is about 0.5 to about 75 or 70 volume percent, based on a total volume of the treatment fluid.

Aspect 5. The method as in any prior aspect, wherein the additive composition comprises the alkylbenzene sulfonic acid, and a content of the alkylbenzene sulfonic acid is about 0.5 to about 99 or 90 volume percent, based on a total volume of the additive composition.

Aspect 6. The method as in any prior aspect, wherein the additive composition comprises the alkylbenzene sulfonate, a content of the alkylbenzene sulfonate is about 0.5 to about 99 volume percent, based on a total volume of the additive composition.

Aspect 7. The method as in any prior aspect, wherein the alkylbenzene sulfonate is a salt of an alkylbenzene sulfonic acid.

Aspect 8. The method as in any prior aspect, wherein the additive composition further comprises an additional surfactant comprising sodium trideceth sulfate.

Aspect 9. The method as in any prior aspect, wherein the additive composition further comprises an acid component.

Aspect 10. The method as in any prior aspect, wherein the treatment fluid comprises about 10 to about 99 volume percent of an aromatic solvent, which comprises at least one of toluene, xylenes, or a low aromatic naphtha, and about 0 to about 50 volume percent of a co-solvent comprising at least one of an alcohol, an amine, an amide, an ether, an ester, a ketone, acetonitrile, dimethylsulfoxide, or a carbonate, each based on a total volume of the treatment fluid; and about 0.5 to about 70 volume percent of the additive composition, the additive composition comprising about 0.5 to about 99 or 70 volume percent of a $C_{8-30}$ alkylbenzene sulfonic acid or a salt thereof; and about 0 to about 12 volume precent of an additional surfactant comprising sodium trideceth sulfate, and about 0 to about 50 volume percent of an acid component, each based a total volume of the additive composition.

Aspect 11. The method as in any prior aspect, wherein the treatment fluid is a homogeneous single-phase fluid, i.e., it is not an emulsion.

Aspect 12. The method as in any prior aspect, wherein the deposits further comprise at least one of a resin, a paraffin wax, or an inorganic scale.

Aspect 13. The method as in any prior aspect, wherein contacting the deposits with the treatment fluid is performed in an environment comprising at least one of a pipeline, a formation, a production zone, a reservoir, or a downhole element.

Aspect 14. The method as in any prior aspect, wherein the deposits are removed from the substrate during a fracturing, acidizing, sand control, remedial, completion, restimulation or refracturing operation.

Aspect 15. The method as in any prior aspect, wherein the deposits are removed during a pumping treatment placed in a completion or remedial operation. The method can establish flow from a reservoir to a wellbore.

Aspect 16. The method as in any prior aspect, further comprising introducing the treatment fluid into a subsurface environment through an umbilical line, a coil tubing, or via a bullhead method through a flowline or a tubing.

Aspect 17. The method as in any prior aspect, wherein contacting the deposits with the treatment fluid is performed in a near-wellbore region, and the method comprises cleaning the near-wellbore region and a downhole element in the near-wellbore region with the treatment fluid.

Aspect 18. The method as in any prior aspect, wherein the method comprises injecting into a subsurface environment the treatment fluid as a pre-flush fluid such that the treatment fluid contacts the deposits on the substrate and injecting into the subsurface environment an aromatic solvent without the alkylbenzene sulfonic acid or the alkylbenzene sulfonate.

Aspect 19. The method as in any prior aspect, wherein the substrate comprises at least one of a formation, a downhole element, a metal, a composite, sand, rock, a mineral, or glass.

Aspect 20. The method as in any prior aspect, further comprising enhancing oil recovery from a subsurface environment.

Aspect 21. The method as in any prior aspect, further comprising reducing the viscosity of oil in the subsurface environment.

Aspect 23. The method as in any prior aspect wherein during the injecting the injection pressure shows a decrease over a period of time, preferably the pressure decrease is at least 2, more preferably at least 5, and yet more preferably at least 10%.

Aspect 24. The method as in any prior aspect wherein a volume of the treatment fluid required is less than preferably less than 50% or more of a volume that is required for the same mitigation using xylene as a treatment fluid.

Aspect 25. The method of any prior aspect wherein the treatment fluid comprises from 50 to 95 parts by volume of aromatic solvent, from 0 to 5 parts by volume of a cosolvent, from 2 to 20 parts by volume if the alkylbenzene sulfonic acid or an alkylbenzene sulfonate.

Aspect 26. The method of any prior aspect wherein the treatment fluid comprises from 0.1 to 10 parts by volume of a nanosurfactant.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). In an embodiment, the term "about" means that the value associated with about can vary by 10%. As used herein, size means largest dimension. Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of removing deposits from a substrate, the method comprising:

providing a treatment fluid comprising a solvent and an additive composition comprising at least one of an alkylbenzene sulfonic acid or an alkylbenzene sulfonate wherein the treatment fluid is substantially free of water and is free of acids other than the alkylbenzene sulfonic acid;

contacting the deposits with the treatment fluid; and separating the deposits from the substrate with the treatment fluid to remove the deposits from the substrate, wherein the deposits comprise asphaltenes.

2. The method of claim 1 wherein during the injecting injection pressure shows a decrease over a period of time, wherein the pressure decrease is at least 2.

3. The method of claim 1 wherein a volume of the treatment fluid required is less than that is required for a same mitigation dissolution of the deposits using a xylene-based treatment fluid which does not include the alkyl benzene sulfonic acid or the alkyl benzene sulfonate.

4. The method of claim 1, wherein the solvent comprises an aromatic solvent; and the aromatic solvent comprises at least one of toluene, xylenes, or a light aromatic naphtha; and a content of the aromatic solvent is about 10 volume percent to about 99 volume percent, based on a total volume of the treatment fluid.

5. The method of claim 4, wherein the solvent further comprises a co-solvent comprising at least one of an alcohol, an amine, an amide, an ether, an ester, a ketone, acetonitrile, dimethylsulfoxide, or a carbonate, and a content of the co-solvent is about 0.1 to about 50 volume percent, based on a total volume of the treatment fluid.

6. The method of claim 1, wherein a content of the additive composition is about 0.5 to about 75 volume percent, based on a total volume of the treatment fluid.

7. The method of claim 1, wherein the additive composition comprises the alkylbenzene sulfonic acid, and a content of the alkylbenzene sulfonic acid is about 0.5 to about 90 volume percent, based on a total volume of the additive composition or the additive composition comprises the alkylbenzene sulfonate, a content of the alkylbenzene sulfonate is about 0.5 to about 99 volume percent, based on a total volume of the additive composition.

8. The method of claim 1, wherein the additive composition further comprises an additional surfactant comprising sodium trideceth sulfate.

9. The method of claim 1, wherein contacting the deposits with the treatment fluid is performed in a subsurface environment comprising at least one of a pipeline, a formation, a production zone, a reservoir, or a downhole element.

10. The method of claim 1, wherein the deposits are removed from the substrate during a fracturing, acidizing, sand control, remedial, completion, refracturing operation, or a pumping treatment placed in a completion or remedial operation.

11. The method of claim 10, further comprising establishing flow from a reservoir to a wellbore.

12. The method of claim 1, further comprising introducing the treatment fluid into a subsurface environment through an umbilical line, a coil tubing, or via a bullhead method through a flowline or a tubing.

13. The method of claim 1, wherein contacting the deposits with the treatment fluid is performed in a near-wellbore region, and the method comprises cleaning the near-wellbore region and a downhole element in the near-wellbore region with the treatment fluid.

14. The method of claim 1, wherein the method comprises injecting into the subsurface environment the treatment fluid as a pre-flush fluid such that the treatment fluid contacts the deposits on the substrate and injecting into the subsurface environment an aromatic solvent without the alkylbenzene sulfonic acid or the alkylbenzene sulfonate.

15. The method of claim 1, wherein the substrate comprises at least one of a formation, a downhole element, a metal, a composite, sand, rock, a mineral, or glass.

16. The method of claim 1, further comprising enhancing oil recovery from a subsurface environment, optionally including reducing the viscosity of oil in the subsurface environment.

17. The method of claim 4, wherein the treatment fluid comprises from 50 to 95 parts by volume of aromatic solvent, from 0 to 5 parts by volume of a cosolvent, and from 2 to 20 parts by volume of the alkylbenzene sulfonic acid or an alkylbenzene sulfonate.

18. The method of claim 17 wherein the treatment fluid comprises from 0.1 to 10 parts by volume of a nanosurfactant.

19. A method of removing deposits from a substrate, the method comprising:

providing a treatment fluid comprising about 10 to about 99 volume percent of an aromatic solvent, which comprises at least one of toluene, xylenes, or a low aromatic naphtha, and about 0 to about 50 volume percent of a co-solvent comprising at least one of an alcohol, an amine, an amide, an ether, an ester, a ketone, acetonitrile, dimethylsulfoxide, or a carbonate, each based on a total volume of the treatment fluid;

about 1 to about 25 volume percent of a $C_{8-30}$ alkylbenzene sulfonic acid or a salt thereof; and about 0 to about 10 volume percent of an additional surfactant comprising sodium trideceth sulfate, about 0 to about 0.07 volume percent of an inorganic acid or organic acid, and less than 1 weight percent of water wherein the volume and weight percents are based on a total volume and weight respectively of the treatment fluid;

contacting the deposits with the treatment fluid; and separating the deposits from the substrate with the treatment fluid to remove the deposits from the substrate, wherein the deposits comprise asphaltenes.

* * * * *